United States Patent
Winkler

[11] 3,891,395
[45] June 24, 1975

[54] CRYSTALLISER WITH INTERGRAL PUMPING MEANS

[75] Inventor: Robert Winkler, Wallisellen, Switzerland

[73] Assignee: Escher Wyss Limited, Zurich, Switzerland

[22] Filed: Apr. 29, 1974

[21] Appl. No.: 465,092

Related U.S. Application Data
[63] Continuation of Ser. No. 205,142, Dec. 6, 1971, abandoned.

[30] Foreign Application Priority Data
Dec. 17, 1970 Switzerland.................. 18692/70

[52] U.S. Cl. ............... 23/273; 165/109; 159/25 A; 159/45; 159/1 C
[51] Int. Cl. ............................................. B01d 9/00
[58] Field of Search .......... 23/273 R, 273 F; 62/58; 159/26 R, 25 A, 1 C; 165/108, 109

[56] References Cited
UNITED STATES PATENTS

| | | | |
|---|---|---|---|
| 1,646,454 | 10/1927 | Isaachsen | 159/1 C |
| 2,478,863 | 8/1949 | Davis | 62/58 |
| 3,380,513 | 4/1968 | Staats | 23/273 R |
| 3,389,974 | 6/1968 | Barattini et al. | 62/58 |
| 3,505,111 | 4/1970 | Malek | 23/273 R |

*Primary Examiner*—Norman Yudkoff
*Assistant Examiner*—Frank Sever
*Attorney, Agent, or Firm*—Robert A. Ostmann

[57] ABSTRACT

In crystalliser with a prismatic container, having a cooler with tubes arranged in the container, means for the regulatable supply and discharge of the solution to be cooled, respectively of the coolant, having further the stirrer mechanism for the solution; the improvement that two walls of the container which face one another are formed as tube plates of the cooler, the tubes of the cooler being disposed transversally of a circulatory flow direction of the solution produced by the stirrer mechanism.

10 Claims, 5 Drawing Figures

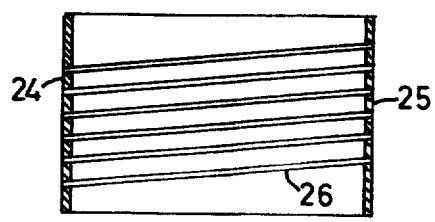
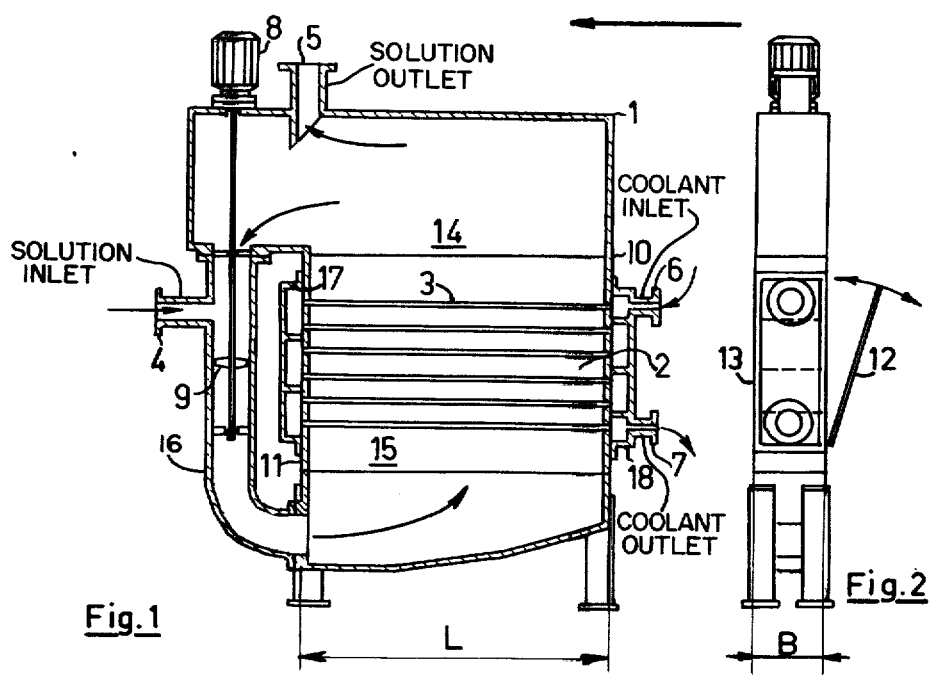
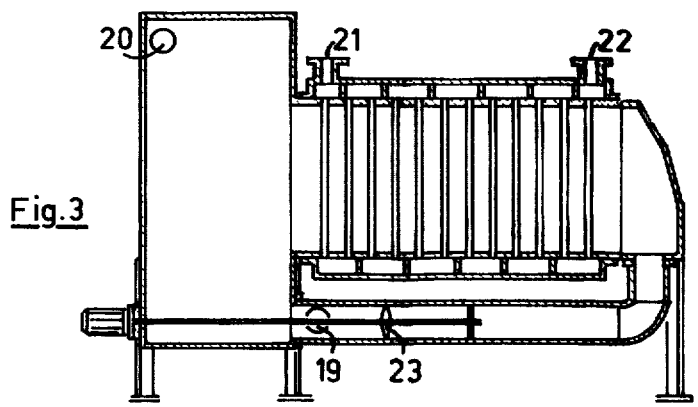

CRYSTALLISER WITH INTERGRAL PUMPING MEANS

CROSS-REFERENCE TO RELATED APPLICATION

This application is a continuation of application Ser. No. 205,142, filed Dec. 6, 1971, now abandoned.

BACKGROUND OF THE INVENTION

The invention relates to a cooling crystalliser of the type having a prism-shaped container in which is located a cooler including heat exchange tubes whose internal and external walls are washed, respectively, by a coolant and by a solution which is to be cooled, means for producing a regulated flow of the solution into and out of the container and corresponding means for circulating coolant through the tubes, and a propeller stirring mechanism for recirculating said solution within the container.

Crystallisers are used for the crystallisation by cooling of various saturated solutions, as for example for the precipitation of sodium chloride from a sodium hydroxide solution originating from diaphragm electrolysis, after this solution has been previously increased in concentration to 50 percent NaOH, or for precipitating sodium sulphate from an enriched sodium chloride sol, and also for precipitating other products from solutions with the temperature-dependent solubility conditions which are similar to those of the aforementioned solutions.

Constructions other than that initially referred to have also been designed for the aforementioned purpose, for example, with containers which are bodies of rotation, or also those with which a coolant, usually cooling water, washes the external wall of the tubes of the cooler, while the solution to be cooled is conveyed through the tubes.

The said relatively viscous solutions have a tendency, on being treated in the former cooling crystallisers, to form crusts on the walls of the tubes. On account of the laminar flow conditions, the heat transfer conditions are unpredictable and consequently the conditions for the cooling of the solution are difficult to choose and adjust. With the inaccessibility of the two sides of the walls of the tubes, the crust formations which occur can only be removed with difficulty, or not at all. The efficiency of the installation gradually falls even if the installation does not have to be stopped because of complete incrustation, usually on the side of the solution.

SUMMARY OF THE INVENTION

The inventor has accordingly set as his object to produce a continuous crystallisation process taking place as far as possible without disruption by an improved arrangement of the individual elements of the cooling crystalliser.

In connection with the cooling crystalliser as initially referred to, this object is achieved according to the invention by two walls of the prism-like container which face one another being formed as tube plates for straight tubes of the cooler which are arranged parallel to one another and guided through the container, the tubes being substantially transversely of a circulatory flow direction of the solution which is exerted by the stirrer mechanism.

A particularly turbulent flow of the solution on the tubes of the cooler is achieved by the fact that the volume of the cooler with its tube plates and tubes shows a passage cross-section of an elongated rectangle, of which the width is at most a third of its length.

Heat transfer processes which can be supervised are obtained by the fact that the tubes are arranged in stages, and, in the stages, relatively to the path of the coolant through the cooler, the tubes are connected in parallel with one another but the stages are connected one after the other, and that, in the container, in addition to the volume or space of the cooler, there are also left free two secondary spaces, which are on the one hand connected to one another only through the space of the cooler but on the other hand are connected by means of a by-pass pipe lying outside the container, the propeller of the stirrer mechanism being arranged in the said by-pass pipe and the solution to be cooled flowing substantially in counter-current to the coolant.

It is desirable for a part of the cooling to be effected by freshly supplied solution being admixed with the already cooled solution which is circulated in the container. This is achieved by the fact that the liquid content of the secondary space, which follows the space of the cooler in the direction of the circulatory flow of the solution, is at least as large as the liquid content of the solution in the cooler, the means for the supply of the solution opening into the by-pass pipe and the means for the discharge solution being arranged at a higher position than the supply arrangement and more especially at the highest point of the container, and further in that the arrangement for supplying the solution into the by-pass pipe opens at a position which is situated before the propeller of the stirrer mechanism, considered in the direction of the circulatory flow of the solution.

The accessibility of the tubes for the possible cleaning of incrustations is assured by the fact that the tube plates together with the tubes are capable of being removed from the crystalliser in the length direction of the tubes, and further that at least one wall of the cooler is provided with a window opening for the cleaning of the external wall of the tubes capable of being covered, and in addition that the two tube plates are provided on their outside with removable end covers, whereby the inside wall of the tubes is accessible for the cleaning operation.

In many cases, it is advantageous if the straight and parallel disposed tubes of the cooler are guided obliquely by an angle up to 10° through the tube plates.

If the by-pass pipe lies between two planes which are determined by the two walls which define the container and which are parallel to the axes of the tubes of the cooler, it is possible from the cooling crystallisers according to the invention, as assembly units, to build up a crystallisation plant in which the space which is available is well-utilised because of the prismatic form of said units.

Because of the combination which is possible in many different ways when assembling such a cooling crystallisation plant from the cooling crystallisers according to the invention, the necessary physical conditions of the given crystallisation process can be accurately obtained. With the unit assembly principle being used, separate parts can be replaced without any serious loss of time in the event of any disruptions occurring.

BRIEF DESCRIPTION OF THE DRAWINGS

The invention is hereinafter more fully described and explained by reference to the accompanying drawings in which:

FIG. 1 is a longitudinal section through a cooling crystalliser in accordance with the first embodiment;

FIG. 2 is a side view of the cooling crystalliser in FIG. 1, seen in the direction of the arrow pointing toward FIG. 1;

FIG. 3 shows another construction in longitudinal section;

FIG. 4 is a longitudinal section through the cooler of a cooling crystalliser having tubes extending obliquely.

DESCRIPTION OF THE PREFERRED EMBODIMENTS

Figure 5:
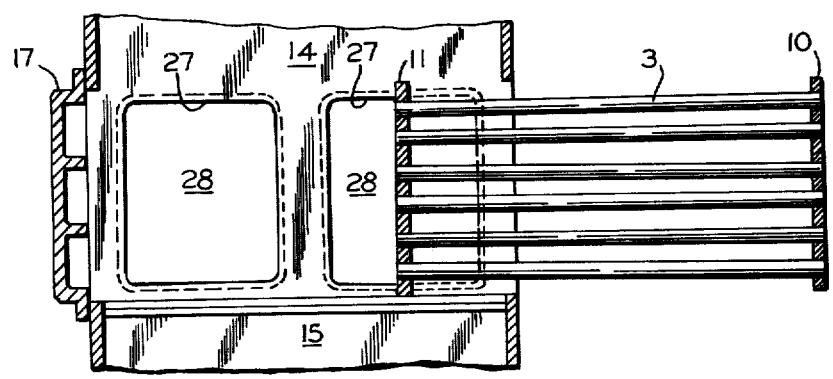
FIG. 5 is an enlarged view of a portion of the FIG. 1 embodiment with the tube plate — tube assembly partially withdrawn from the container.

The cooling crystalliser according to the first embodiment has a prismatic container 1 with a cooler 2 arranged in the said container 1 and having tubes 3 as heat exchange elements. The tubes 3 are washed on their inside wall by a coolant and on their outside wall by a solution which is to be cooled. A means for the regulatable supply and discharge of the solution (the means is not shown), is associated with the container 1 and is connected to the solution inlet union 4 and the solution outlet union 5. Furthermore, the container 1 also has associated therewith a means (not shown) for the regulatable supply and discharge of the coolant, said means being connected to the coolant inlet union 6 and coolant outlet union 7. A stirrer mechanism 8 with a propeller 9 is introduced for the circulation of the solution in the container 1. The opposite walls 10 and 11 of the prismatic container 1 are constructed as tube plates for straight tubes 3 extending parallel to one another through the container 1. The tubes 3 are disposed substantially transversely of a circulatory flow direction of the solution (arrows in FIG. 1) produced by the stirrer mechanism 8 and the propeller 9.

The volume of the cooler 2, which is defined by the walls 10 and 11 formed as tube plates and also by the sides walls 12 and 13 and through which the tubes 3 are guided, has a passage cross-section of an elongated rectangle, the width B of which is at most a third of its length L. The tubes 3 are so arranged in relation to the path of the coolant through the cooler 2 that they are connected in the horizontal direction in passes or stages (in the longitudinal section, the individual stage is only to be seen as one tube 3). In these stages, the individual tubes are connected in parallel with one another. However, the stages are connected in series one after the other. In the container 1, in addition to the volume or space of the cooler 2, there are also left free two secondary spaces 14 and 15. These latter spaces 14 and 15 are connected to one another on the one hand only through the space of the cooler 2, while on the other hand they are connected by means of a by-pass pipe 16 lying outside the container 1. The propeller 9 of the stirrer mechanism is arranged in this by-pass pipe 16. The solution to be cooled is moved substantially in counter-current to the coolant, which enters the tubes 3 of the cooler 2 through the union 6 and is discharged from the said cooler through the union 7. The liquid content of the secondary space 14, which follows the space of the cooler 2 in the direction of the circulatory flow of the solution, is at least as large as the liquid content of the solution in the space of the cooler 2. The means for supplying the solution (not shown) opens into the by-pass pipe 16 through the union 4. The means for the discharge of the solution (not shown) is connected to the union 5, that is to say, at a position which is at a higher level than the union 4, and in this case at the highest point of the container 1. The arrangement for the supply of the solution (not shown) opens by way of the union 4 into the by-pass pipe 16 at the position which, in the direction of the circulatory flow of the solution, is situated before the propeller 9. The cooler 2 with the walls 10 and 11 constructed as tube plates is made as a unit in conjunction with the tubes 3 and can be extracted as a whole from the container 1 in the length direction of the tubes 3 (as shown in FIG. 5).

For the purpose of accessibility to the external walls of the tubes 3, the side wall 12 of the container 1 is made so that it can be hinged. For the same purpose, window openings which can be covered could be provided, at least on one side of the cooler 2, i.e. in the wall 12 and/or 13 (see, for example, the windows 27 and covers 28 in FIG. 5).

For the purpose of accessibility to the internal walls of the tubes 3, the two walls 10 and 11 which are formed as tube plates are provided with end covers 17 and 18 which can be removed.

The cooling crystalliser in FIG. 3 merely differs from the construction which has just been described by the fact that the whole construction is turned 90°. The solution inlet union is indicated at 19 and the solution outlet union at 20. The coolant inlet union is indicated at 21 and the coolant outlet union at 22. The propeller of the stirrer mechanism bears the reference 23. In this cooling crystalliser, the solution to be cooled also flows substantially in counter-current to the coolant.

With the construction of the cooler as shown in FIG. 4, the walls 24 and 25 which are disposed opposite one another are made as tube plates for the straight and parallel disposed tubes 26. The tubes 26 entend obliquely at an angle up to 10° through the tube plates 24 and 25.

The by-pass pipe 16 lies between two planes, which are defined by the two walls 12 and 13 of the container 1. These walls 12 and 13 laterally limit the container 1 and extend parallel to the longitudinal axes of the tubes 3 of the cooler 2. Consequently, the by-pass pipe 16 is not to be seen in FIG. 2.

I claim:

1. A crystalliser comprising
    a. a generally prismatic container including first and second pairs of parallel planar walls which bound a heat exchanger space in the form of a duct of rectangular cross section, portions of the walls of the first of said pairs being formed as tube plates,
    b. the container also containing two free spaces at its opposite ends which are enclosed in part by portions of the second of said pairs of walls and which communicate with each other through said duct of rectangular cross section;
    c. a plurality of straight, parallel heat exchange tubes extending between said tube plates;
    d. conduit means for circulating a coolant through said tubes;
    e. duct means, including a pump, interconnecting said end spaces and providing therebetween a second, confined flow path separate from the confined flow path through the heat exchanger space, the duct means and the container spaces defining a definite recirculation loop for solution to be cooled which forces the solution to flow in series through the first end space, the heat exchanger space, the second end space and the duct means, and then return to the first end space; and f. inlet and outlet passages serving, respectively, to conduct said solution into and out of the container.

2. A crystalliser as defined in claim 1 in which
a. the cross section of the heat exchanger space is an elongated rectangle having a width which is not greater than one-third the length; and
b. the tubes extend in the direction of the length of said cross section.

3. A crystalliser as defined in claim 2 in which
a. the conduit means divides the tubes into a plurality of serially arranged passes each of which comprises a group of tubes connected in parallel flow relation; and
b. said passes are so arranged that the coolant and the solution flow in counter-current heat exchange relation.

4. A crystalliser as defined in claim 3 in which
a. the volume of the second end space is at least as large as the volume of the heat exchanger space;
b. the inlet passage opens into the duct means; and
c. the outlet passage is located at a higher elevation than the inlet passage.

5. A crystalliser as defined in claim 4 in which
a. the outlet passage is located adjacent the uppermost portion of the container; and
b. the inlet passage opens into the duct means at a point upstream of the pump.

6. A crystalliser as defined in claim 1 in which the tubes and tube plates define an assembly which can be removed as a unit from the container in the direction of the tube axes.

7. A crystalliser as defined in claim 1 in which at least one wall of the second pair of parallel walls contains a window which is located in the region of the heat exchanger space and is closed by a detachable cover, the window rendering the external walls of the tubes accessible for cleaning operations.

8. A crystalliser as defined in claim 1 in which the conduit means is defined by end covers which overlie the outside surfaces of the tube plates, the covers being detachable so as to render the internal walls of the tubes accessible for cleaning operations.

9. A crystalliser as defined in claim 1 in which the tubes extend obliquely, at an angle up to 10°, through the tube plates.

10. A crystalliser as defined in claim 1 in which the duct means includes a by-pass pipe which is located outside the container and lies between two planes determined by the second pair of parallel walls.

* * * * *